(12) United States Patent  
Kagei (10) Patent No.: US 7,916,172 B2
(45) Date of Patent: Mar. 29, 2011

(54) IMAGE PICKUP APPARATUS WITH OBJECT TRACKING CAPABILITY

(75) Inventor: Kenji Kagei, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 514 days.

(21) Appl. No.: 11/531,085

(22) Filed: Sep. 12, 2006

(65) Prior Publication Data

US 2007/0058046 A1 Mar. 15, 2007

(30) Foreign Application Priority Data

Sep. 13, 2005 (JP) ................. 2005-266058

(51) Int. Cl.
*H04N 5/225* (2006.01)
*H04N 5/228* (2006.01)
*G06K 9/00* (2006.01)

(52) U.S. Cl. .............. 348/169; 348/208.14; 348/172; 382/165; 382/103

(58) Field of Classification Search .......... 348/208.14, 348/169–172, 143–158, 211.14; 382/165; 382/103

See application file for complete search history.

(56) References Cited

U.S. PATENT DOCUMENTS

| 4,908,704 | A | * | 3/1990 | Fujioka et al. ............. 348/155 |
| 5,111,288 | A | * | 5/1992 | Blackshear .................. 348/143 |
| 5,204,749 | A | * | 4/1993 | Toyama et al. .............. 348/352 |
| 5,912,980 | A | * | 6/1999 | Hunke ........................ 382/103 |
| 6,246,837 | B1 | * | 6/2001 | Kageyama et al. .......... 396/287 |
| 6,445,409 | B1 | | 9/2002 | Ito et al. |
| 7,151,558 | B1 | * | 12/2006 | Kogane et al. .............. 348/151 |
| 2003/0117516 | A1 | * | 6/2003 | Ishida et al. ............... 348/348 |

FOREIGN PATENT DOCUMENTS

| JP | 59-208983 | | 11/1984 |
| JP | 1-256876 | | 10/1989 |
| JP | 2002-247440 | | 8/2002 |
| JP | 2002247440 | A * | 8/2002 |
| JP | 2003-069884 | A | 3/2003 |

OTHER PUBLICATIONS

European Patent Office Communication concerning Appln. 06120477-2-1248 which enclosed extended Search Report dated Jun. 12, 2008.

* cited by examiner

*Primary Examiner* — Lin Ye
*Assistant Examiner* — Mekonnen Dagnew
(74) *Attorney, Agent, or Firm* — Rossi, Kimms & McDowell LLP (57) ABSTRACT

The present invention provides an image pickup apparatus for automatically tracking an object to pick up an image of the object, and the image apparatus comprises; a lens apparatus including a zoom lens and a focus lens, the lens apparatus picking up an image of the object; a camera device for picking up an image of the object acquired by the lens apparatus; a universal head for driving pan and tilt of the camera device; a memory for recording trace data of the universal head and image information picked up in synchronization with the trace data; an object recognizing circuit for recognizing the object; a shift amount detection unit for detecting a shift amount between the object and the trace data; and a control device for controlling the driving operation of the universal head based on the trace data and the shift amount.

4 Claims, 11 Drawing Sheets

| | | | |
|---|---|---|---|
| STILL IMAGE | | | |
| SIZE | 200pixels | 400pixels | 1700pixels |
| INTERVAL | 2.8sec | 8.4sec | 7.7sec |
| MEDIAN CENTER (x) | 950 | 720 | 580 |
| MEDIAN CENTER (y) | 630 | 600 | 590 |

| | | |
|---|---|---|
| STILL IMAGE | | |
| SIZE | 1300pixels | 180pixels |
| INTERVAL | 7.0sec | x |
| MEDIAN CENTER (x) | 280 | 50 |
| MEDIAN CENTER (y) | 310 | 120 |

IMAGE PICKUP APPARATUS WITH OBJECT TRACKING CAPABILITY

BACKGROUND OF THE INVENTION

1. Field of the Invention

The present invention relates to an image pickup apparatus which automatically track a moving object to pick up an image of it.

2. Description of the Related Art

Conventionally, an automatic tracking function which may be able to track a moving object by manipulating a TV camera in pan and tilt mode mounted on a universal head such as one disclosed in Japanese Patent Publication No. 2868087 is known. Also, a method in that the automatic tracking function may be combined with a trace function which may duplicate operation based on operational data of zoom, focus, pan and tilt recorded in advance, as described in Japanese Examined Patent Application Publication No. H6-14698, is known.

Further, a method in that an object is automatically tracked so that a primary control position of the object is kept to be at a constant position in an image plane, as described in Japanese Patent Application Laid-Open No. 2002-247440, is known. In this method, with respect to primary control position data composed of at least one of primary control positions of pan, tilt and height, secondary control position data composed of at least one of secondary control positions excluding the primary ones of pan, tilt, zoom and focus is prepared and recorded in advance.

Then, a disadvantage of undesirable up-and-down motion in the automatic tracking function as described above can be eliminated, and tracking without limit of a moving range can be achieved, by varying the secondary control position data relative to the primary control positions.

However, in the conventional embodiments described above, because at least one of the pan, tilt and height to be the primary control positions of the targeted object will always take a constant value, an acquirable image may be limited, and tracking sufficient to fulfill aims of a photographer may be difficult.

SUMMARY OF THE INVENTION

Therefore, the present invention provides an image pickup apparatus that can automatically pick up an image in a composition defined by an arbitrary position and size which a photographer previously sets up, even if an object to be targeted will move unexpectedly to the photographer.

Also, the present invention provides an image pickup apparatus that can automatically pick up an image in an arbitrary composition of a photographer, even if advance trace data is not prepared for a composition as intended by the photographer, by providing a function for easily editing the advance trace data.

One aspect of the present invention is an image pickup apparatus that automatically tracks an object to pick up an image of the object, and the image pick up apparatus includes: a lens apparatus including a zoom lens and a focus lens, the lens apparatus picking up an image of the object; a camera device provided with the lens apparatus for picking up an image of the object acquired by the lens apparatus; a universal head for supporting the camera device and driving pan and tilt of the camera device; a memory for recording trace data of the universal head derived from tracking the object and image information picked up in synchronization with the trace data; an object recognizing circuit for recognizing the object; a shift amount detection unit for detecting a shift amount between the object and the trace data; and a control device for controlling the driving operation of the universal head based on the trace data and the shift amount.

Further features of the present invention will become apparent from the following description of exemplary embodiments (with reference to the attached drawings).

BRIEF DESCRIPTION OF THE DRAWINGS

FIG. 10 illustrates trace data compensated for.

DESCRIPTION OF THE EMBODIMENTS

The present invention will be described hereinafter with respect to embodiments with reference to the drawings.

Figure 1:
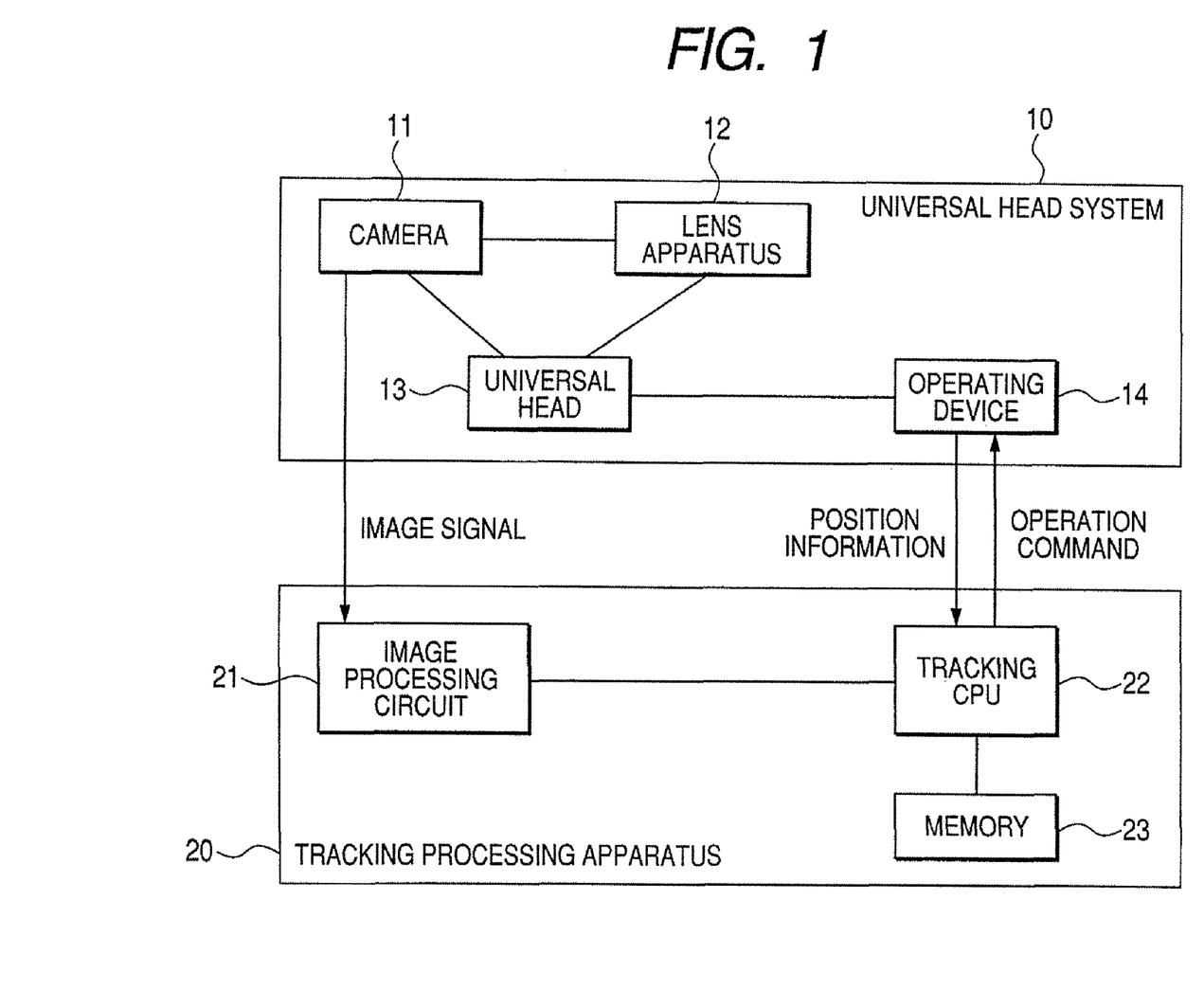
FIG. 1 is a block diagram illustrating a configuration of an embodiment.

Referring to FIG. 1, a block diagram illustrating the whole structure of an intelligent universal head system according to the present invention is shown. The universal head system 10 includes a TV camera 11, a lens apparatus 12 attached to the TV camera 11, an universal head 13 for driving the TV camera 11 to pan and tilt and an operating device 14 for controlling the universal head 13. Further, a tracking processing apparatus 20 located separately from the universal head system 10 includes an image processing circuit 21, a tracking CPU 22 and a memory 23.

The image processing circuit 21 receives an image signal from the camera 11 and extracts size and shape information of an object necessary for tracking from the signal to transmit it to the tracking CPU 22. The tracking CPU 22, based on the feedback information from the image processing circuit 21, computes a controlled variable to be manipulated at the time and commands the operating device 14, and the operating device 14 transmits an operation command to the universal head 13 to manipulate the TV camera 11.

Figure 2:
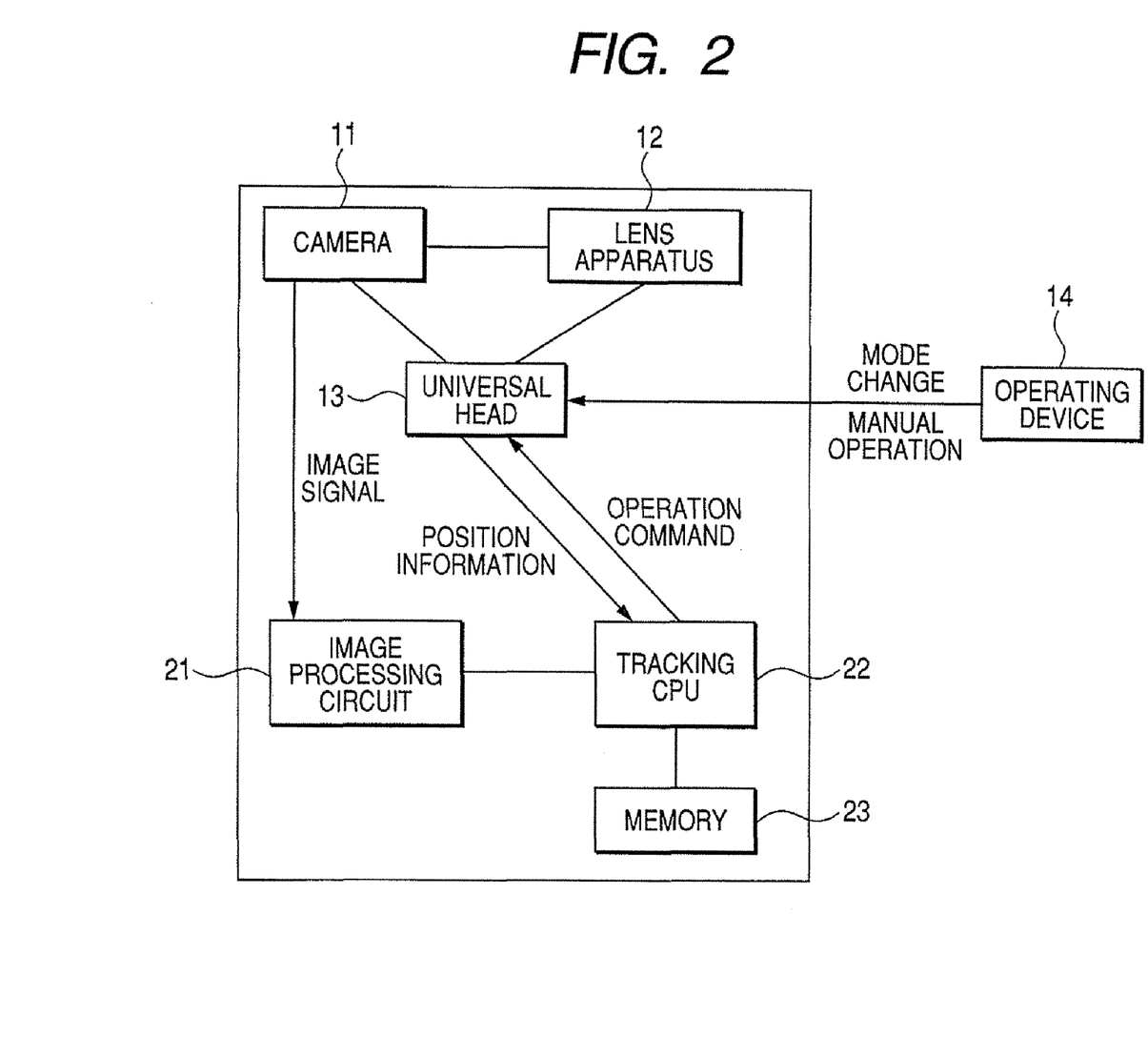
FIG. 2 is a block diagram illustrating a configuration of a variation.

However, although the tracking processing apparatus 20 is configured to control the operating device 14, the operating device 14 may be used only for mode change of the universal head 13 and manual operation, with the tracking processing apparatus 20 being located on the side of the universal head system 10 and the operating device 14 outside, as shown in FIG. 2.

Figure 3:
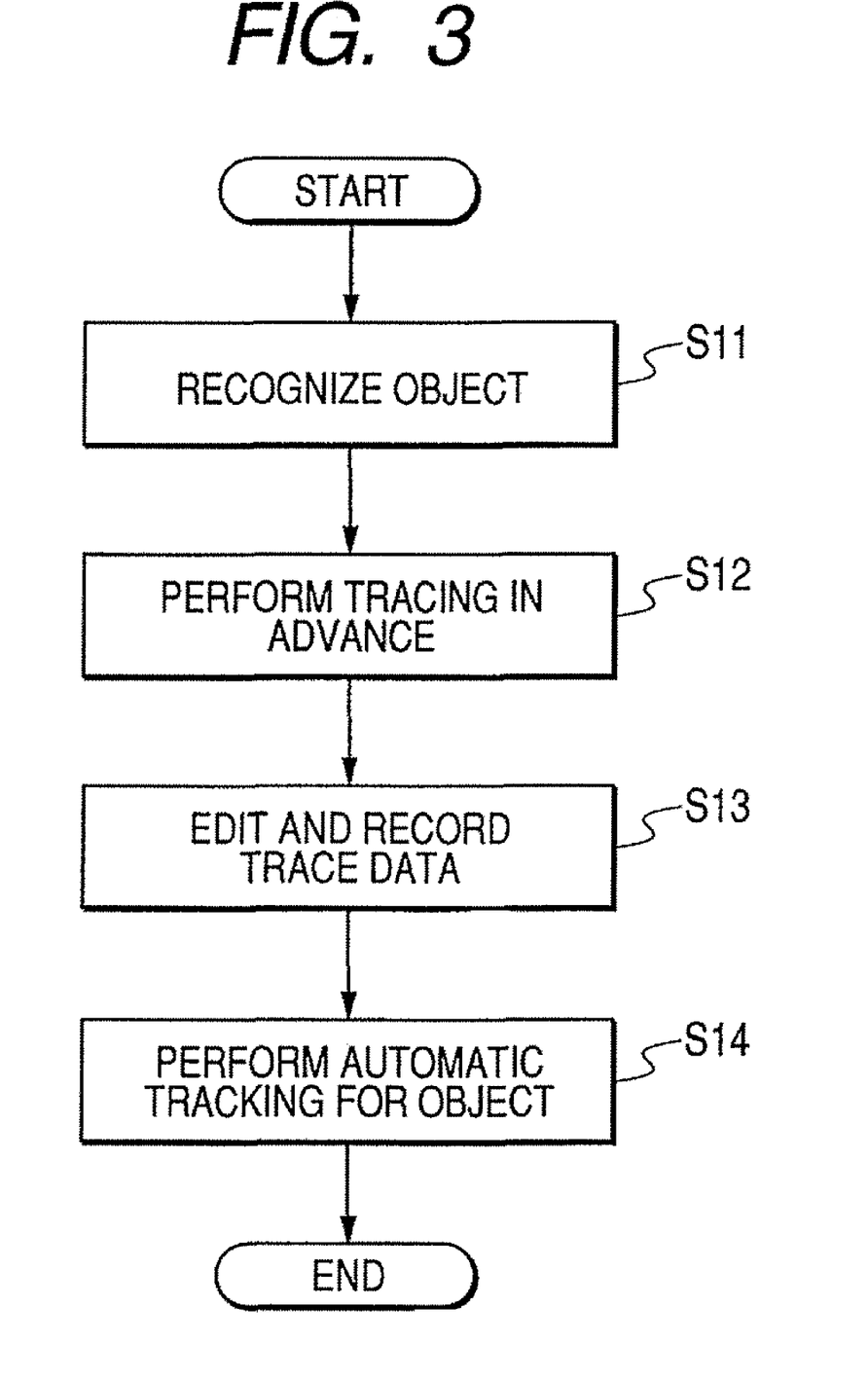
FIG. 3 is a flow chart illustrating procedures.

FIG. 3 is a flow chart illustrating a sequence of operations of the tracking processing apparatus 20. An object is recognized in an image by sequential mode switching of the universal head system 10 performed by the image processing circuit 21 from an object recognition mode to a trace data acquisition mode, then to a trace data edit mode (step S11).

Next, the object is traced in advance (step S12), then trace data is edited and recorded (step S13), and finally in an automatic tracking mode, the object is automatically tracked in a composition as intended by a photographer (step 14).

Figure 4:
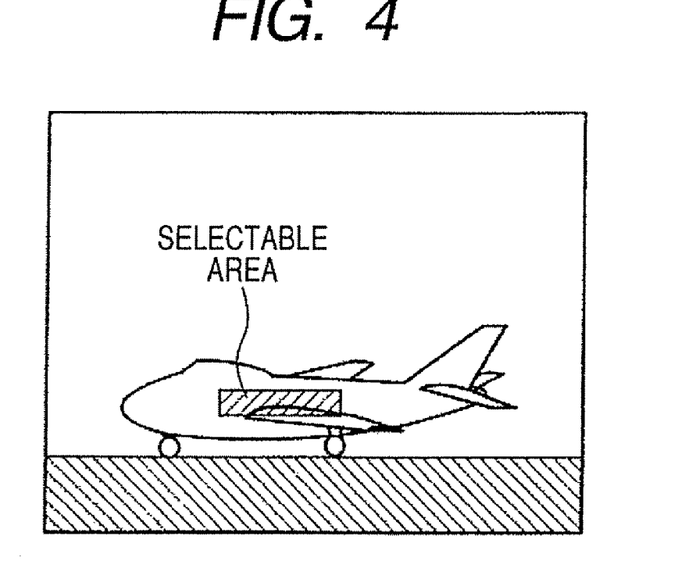
FIG. 4 illustrates a method for collecting color information of an object.

Procedures for recognizing the object in step 11 are, first setting of the universal head system 10 to the object recognition mode, then, for example as shown in FIG. 4, acquisition of a still image showing up an airplane as an object, and selection by a photographer of a color area of the fuselage in the airplane by which the object is most characterized. The tracking CPU 22 will compute an average value of color which occupies the largest area of this area or which is present in the selected area, and record the value as color information in the memory 23.

Then, for recognizing the object in pickup image information, for example two-dimensional array corresponding to pixels in an image plane may be provided such that when the color information for each of the pixels is within a certain threshold from the color of the object recorded as described above, a relevant element of the array is set to "1" and otherwise to "0". A portion which is the largest area among areas distinguished in such a manner is recognized as a final object.

Figure 5:
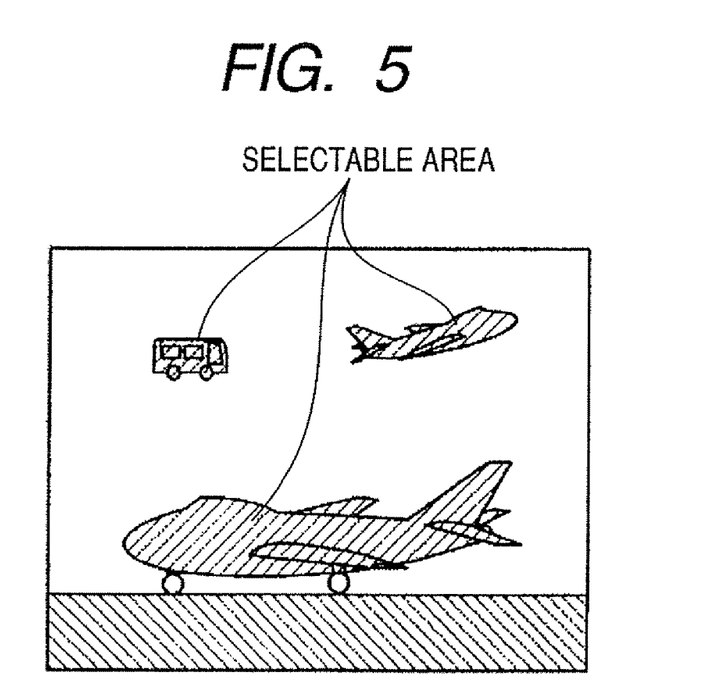
FIG. 5 illustrates a method for selecting an arbitrary area.

Then, although the final object is defined as the largest area in the method described above, a photographer may select an area to be the final object by using a click etc. from areas displayed which are larger than a certain level as shown in FIG. 5.

Figure 6:
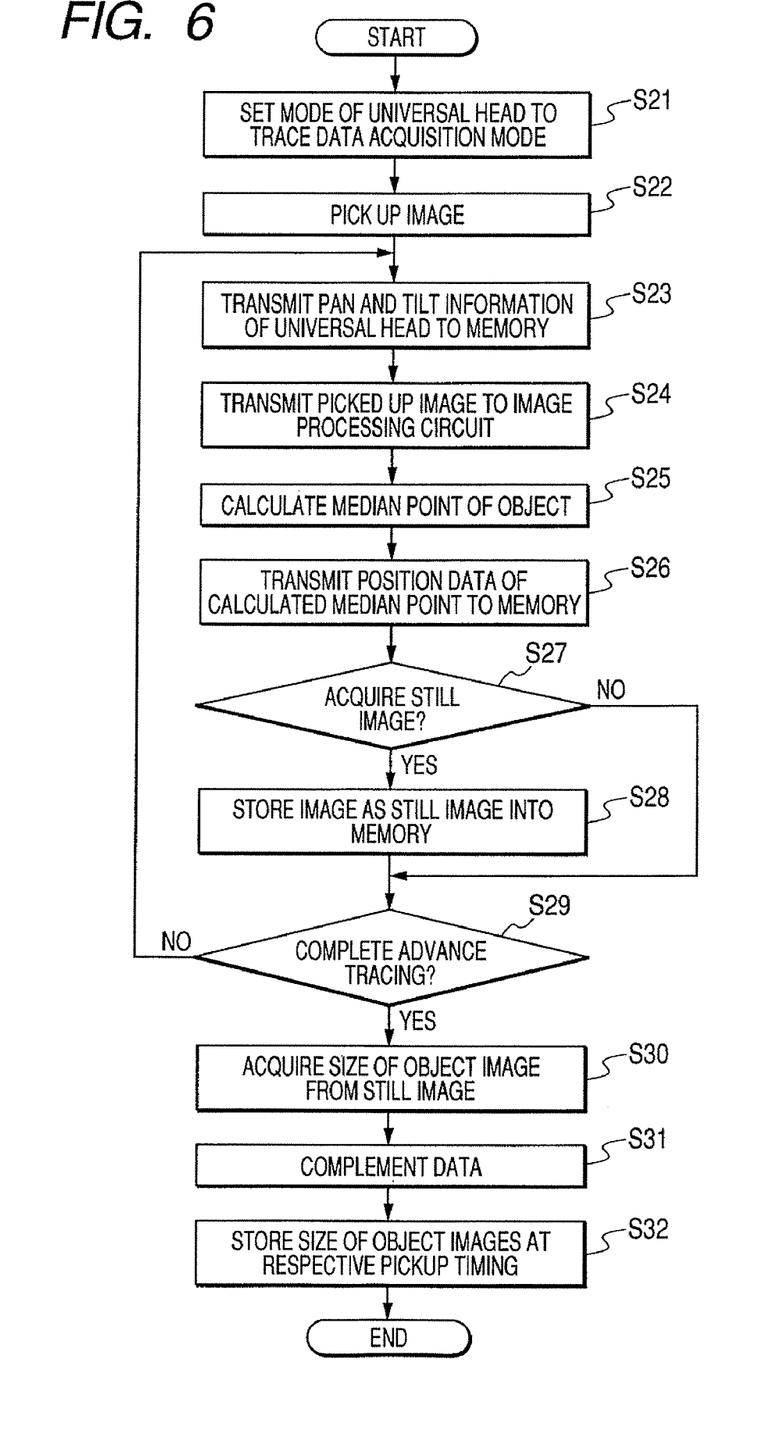
FIG. 6 is an operational flow chart for acquiring trace data.

FIG. 6 is an operational flow chart illustrating steps S12 and S13 shown in FIG. 3 up to trace data recording. First, a photographer sets the universal head system 10 to the trace data acquisition mode (step S21), then picks up manually an image in a composition intended to record (step S22). In the meantime, the universal head system 10 transmits pan and tilt position information through the tracking CPU 22 to the memory 23 at a regular period (step S23).

Further, an image picked up by the TV camera 11 is transmitted to the image processing circuit 21 (step S24), then the object is recognized in the method as described above, subsequently a median point of the object is computed therefrom (step S25), and position information of the median point is transmitted to the memory 23 (step S26). In sequence from the start of the procedures, four data sets, i.e. the pan and tilt positions of the universal head 13, and X and Y coordinates of the median point of the object are stored in the memory 23 as a two-dimensional array.

In such a manner, a position of the object after a certain period of time elapsed from the start may be determined from an interval between data acquiring times and indexes of an array indicating what number data is.

Figure 7:
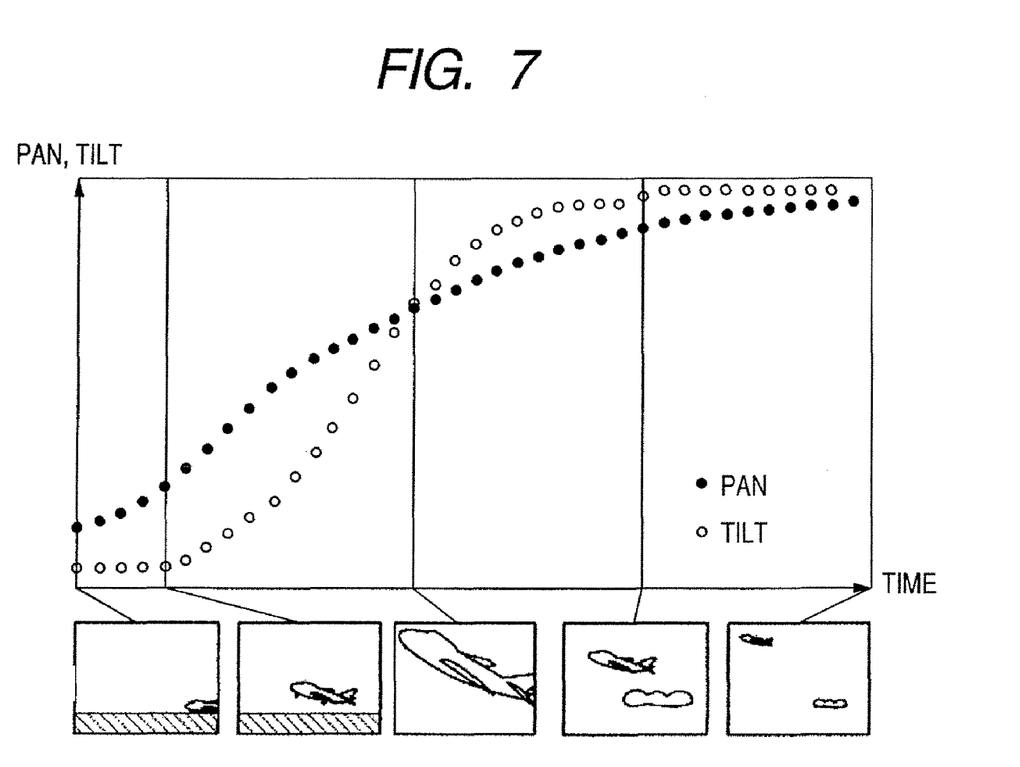
FIG. 7 illustrates trace data acquired.

Alternately, the operating device 14 may, for example include a structure that allows acquisition of an image as a still image to be performed by a push of a switch, and a photographer will push the switch at a key point that a desired composition is formed. Alternately, an image may be automatically taken regularly at a certain interval (step S27) to acquire a plurality of still images (step S28). Accordingly, pan and tilt data regular at a certain interval as shown in FIG. 7, and X and Y coordinates of the object median point in an image plane similarly to these may be obtained, and also still image data will be at a certain time stored in the memory 23.

Figure 8:
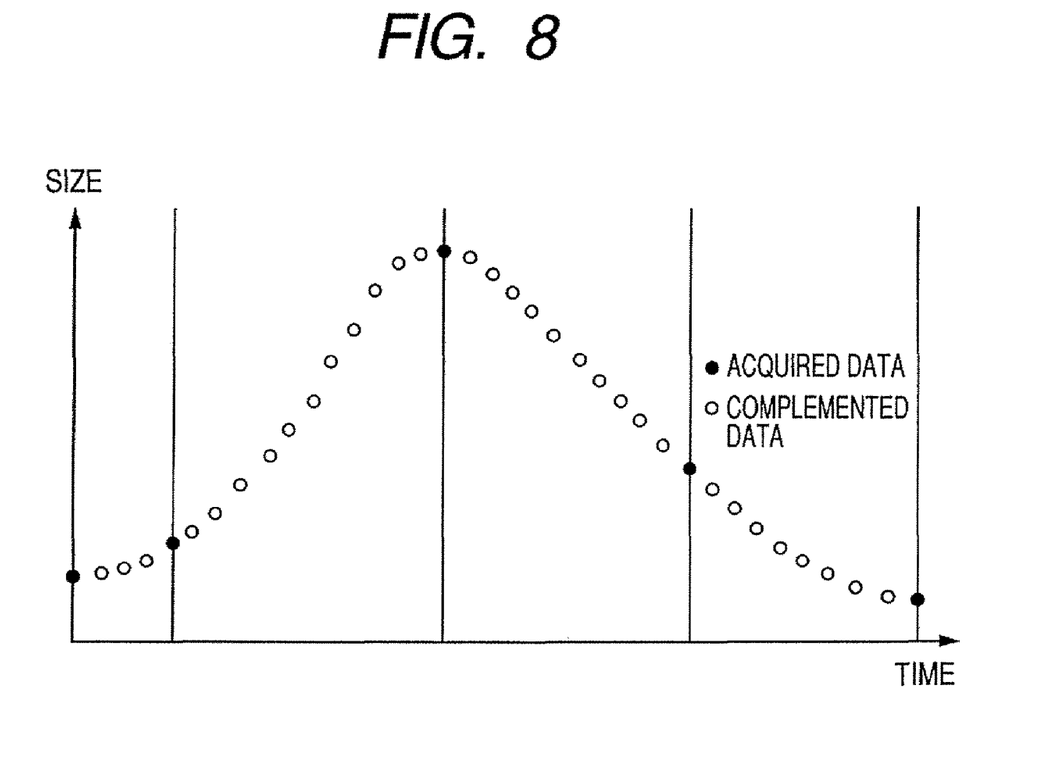
FIG. 8 is a graph illustrating size data of an object having complemented data.

After a photographer completes advance tracing (step S29), an object size at an acquiring time of a still image is acquired with the method described above (step S30). This data may be complemented by using a data complementing method, for example linear interpolation or spline interpolation, and as a result, an object size complemented at the time computed by the data complementing is also added to the two-dimensional array, as shown in FIG. 8.

Figure 9:
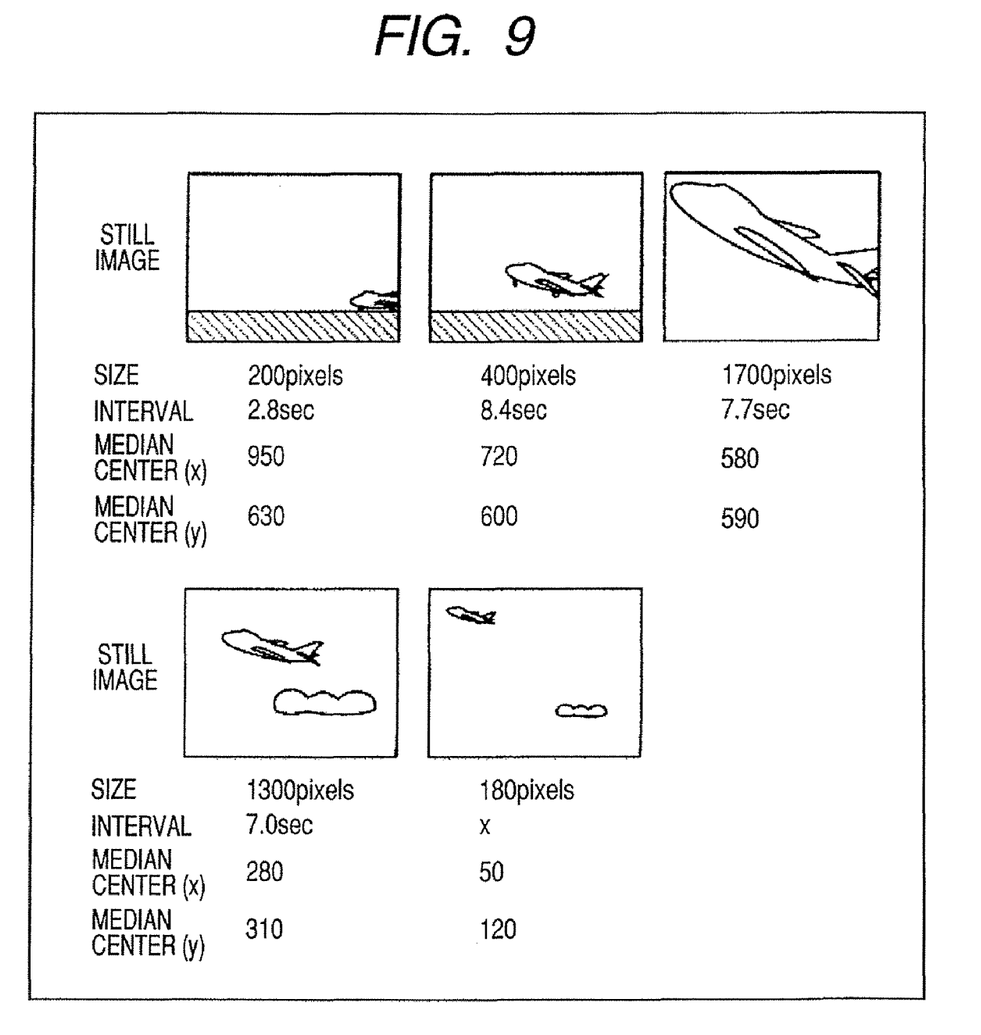
FIG. 9 is an elevation view of an operation display.
Figure 10:
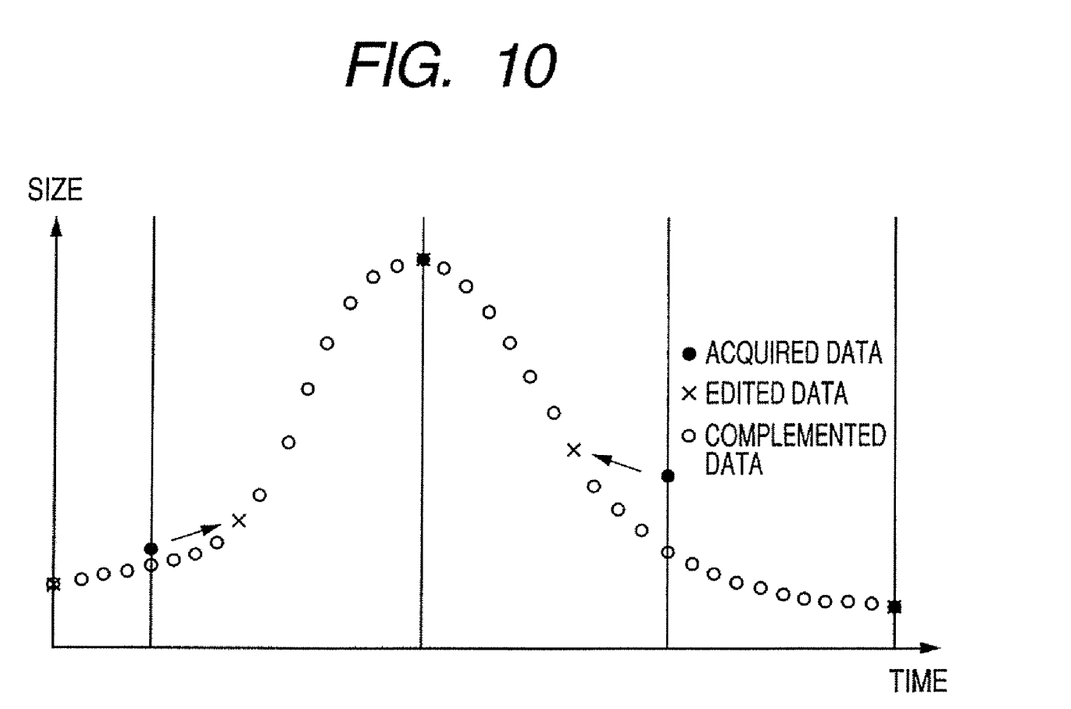

In editing the trace data, the size of the abject and the position of the median point which are contained in a still image to be a key point and are present in an image plane at the time, and an interval between respective images are displayed on, for example a display as shown in FIG. 9. Then by changing the size, the position of the median point and the interval between images to arbitrary values and, as shown in FIG. 10, complementing data once again, final trace date is recorded in the memory 23.

Figure 11:
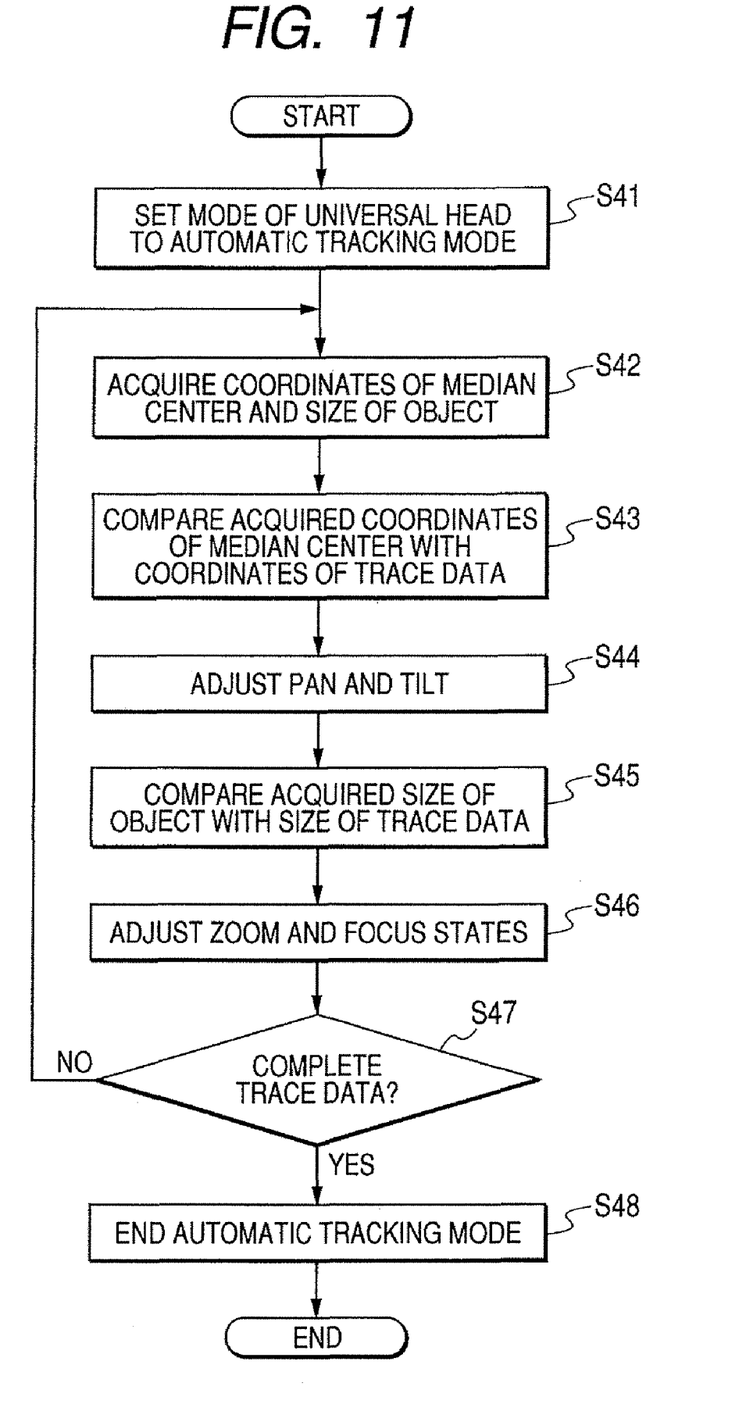
FIG. 11 is an operational flow chart for an automatic tracking mode when color recognition is used for object recognition.

FIG. 11 is an operational flow chart of procedures for the automatic tracking function in step S14 shown in FIG. 3. First, the universal head system 10 is set to the automatic tracking mode (step S41), then the tracking CPU 22 starts to perform automatic tracking, and the tracking processing apparatus 20 acquires the coordinate of the median point and the size of a moving object to be targeted from the image processing circuit 21 (step S42). The coordinate of the median point obtained is compared to the coordinate in the trace data (step S43), and pan and tilt are adjusted to fit the trace data (step S44).

Similarly, by comparing the obtained size of the object to be targeted with the size of the object in the trace data (step S45), zoom may be adjusted to fit the trace data (step S46). Because this zoom adjustment may cause focus to change, focus will be changed by an auto focusing function and the like.

In adjustment, in order that the size of the object is not changed, a lens provided with CAFS (Constant Angle Focusing System) structure may be used, or zoom and focus adjustments may be repeated. Thereby, an image is made to be such that it has the same size of the object as that in the obtained data of the object and is in focus state. Next, it is determined whether any more data to process is present (step S47), and if any, returning to step S42, and if not, the automatic tracking mode ends (step S48).

In embodiments described above, the color information is used for object recognition, while, as another method, a method using pattern matching on the basis of shape for object recognition may be conceivable. In the pattern matching on the basis of shape, normalized correlation between two images and the maximal value of the image correlation will be found out. In this embodiment, first, an object is recognized in shape, then by matching the object in a next still image to the recognized object to obtain a parallel shift amount and ratios of magnification and contraction thereof, automatic tracking may be performed.

In the pattern matching, firstly, a recognition method may be such that two images of an object to be targeted are picked up during moving, and then an area which is picked up in both two images computed from position information of the universal head 13 is defined as a comparison frame. In this comparison frame, a delta between the two images is acquired, and thereby a moving object is recognized. On this occasion, if a plurality of the moving objects recognized from the delta may be present, similarly to the case of using the color information described above, the moving object having the largest area may be selected from them, or a photographer may select as shown in FIG. 5.

The trace data is acquired, edited and recorded similarly to the case of the color recognition, while, in the case of the pattern matching, size information of the object may not be required. Therefore, in sequence from the start, four data sets, i.e. pan and tilt positions of the universal head 13, and X and Y coordinates of the median point of the object in an image plane are stored in the memory as a two-dimensional array.

Figure 12:
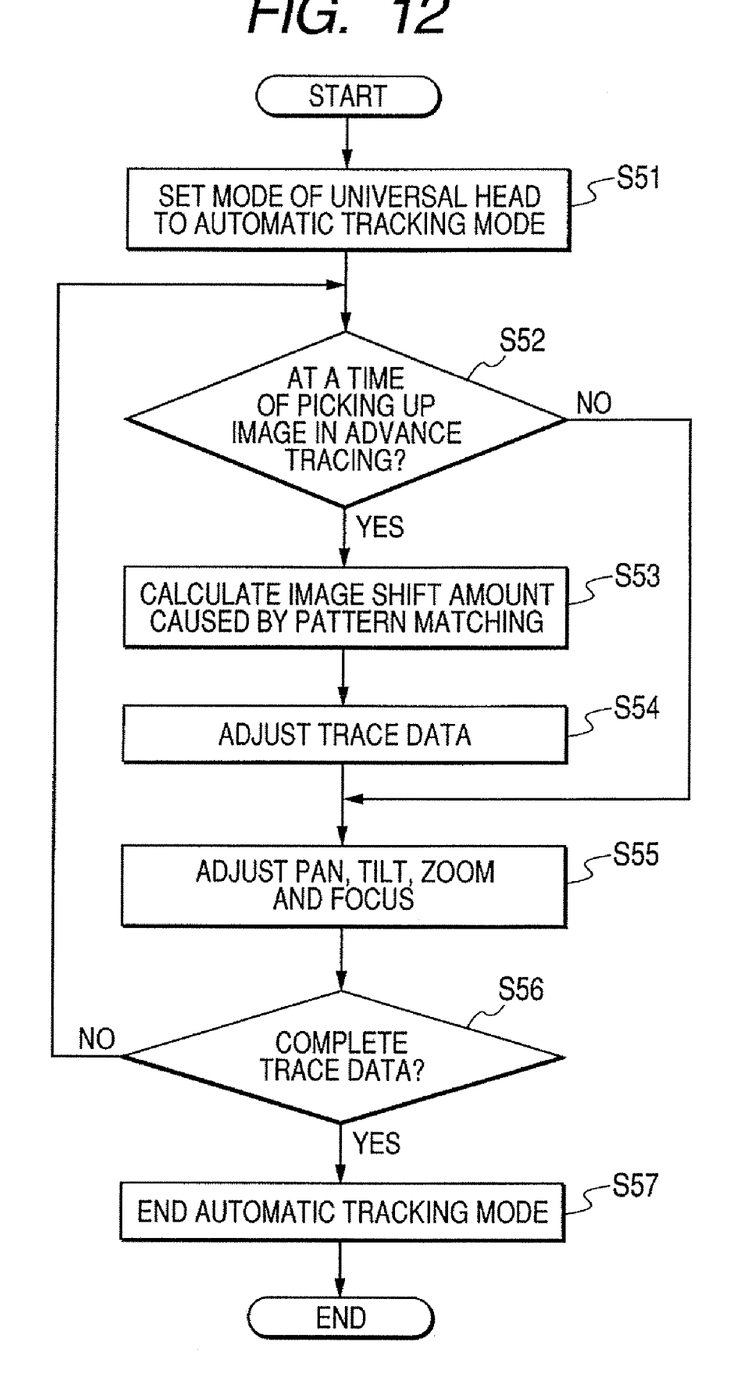
FIG. 12 is an operational flow chart for an automatic tracking mode when pattern matching is used for object recognition.

FIG. 12 is a flow chart for the automatic tracking mode when the pattern matching is used. First, the universal head 13 is set to the automatic tracking mode similarly to the case of the color recognition (step S51). Next, it is determined whether image pickup is performed at the time of advance trace (step S52), and if the image pickup is performed at the time of advance trace, a shift amount between the trace data and the current image is computed by carrying out the pattern matching (step S53).

By means of this computation of the shift amount, pan, tilt and zoom data to the next time of image pickup of the trace data is corrected for (step S54), and for a period to the next time of image pickup, pan, tilt and zoom is controlled based on the trace data (step S55).

While, if it is not a time for image pickup in step S52, going to step S55, and change in a size of the object will be prevented by performing the auto focusing function described above. Subsequently, it is determined whether any more data to process is present (step S56), and if any, returning to step S52, and if not, the automatic tracking ends (step S57).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-266058, filed Sep. 13, 2005, which is hereby incorporated by reference herein in its entirety.

What is claimed is:

1. An image pickup apparatus for automatically tracking an object to pick up an image of the object, comprising:
    a lens apparatus including a zoom lens and a focus lens, the lens apparatus picking up an image of the object;
    a camera device provided with said lens apparatus for picking up an image of the object acquired by the lens apparatus;
    a universal head for supporting said camera device and driving pan and tilt of the camera device,
    a memory for recording pan data, tilt data, zoom data and focus data of said lens apparatus and said universal head, and a size data and a positional data of the image of the object, associated with time information, said pan data, tilt data, zoom data, focus data, size data and positional data being derived from tracking the object and picking up the image of the object;
    a recognizing circuit for recognizing said object;
    a shift amount detection unit for detecting a shift amount between the size data and the positional data of the image of the object recorded within the memory, and the size data and the positional data of the image of the object picked up by said camera device; and
    a control device for controlling said lens apparatus and said camera device and said universal head on the basis of the shift amount detected by said shift amount detection unit and the pan data, tilt data, zoom data and focus data,
    wherein in a case that said shift amount detection unit detects a positional shift between the positional data of the object recorded within the memory and the positional data of the object picked up by said camera device, said control device controls said universal head to drive the pan and tilt of said camera device so as to reduce the positional shift, and in a case that said shift amount detection unit detects a size shift between the size data of the object recorded within the memory and the size data of the object picked up by said camera device, said control device controls said lens apparatus to perform a zoom adjustment so as to reduce the size shift.

2. The image pickup apparatus according to claim 1, wherein:
    said shift amount detection unit detects a shift in a position of said object and a shift in a size of said object; and
    said control device controls the pan and tilt driving operation of said universal head in response to said shift in the position of said object and controls the zoom and focus driving operation of said lens apparatus in response to said shift in the size of said object.

3. The image pickup apparatus according to claim 1, wherein said recognizing circuit recognizes said object based on at least one of color of said object or shape of the object.

4. The image pickup apparatus according to claim 1, further comprising an editing unit for editing at least one of time data of said trace data or position data of said object.

* * * * *